US006731196B1

(12) United States Patent
Ruediger

(10) Patent No.: US 6,731,196 B1
(45) Date of Patent: May 4, 2004

(54) SAFETY DEVICE

(75) Inventor: Bartz Ruediger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/720,292

(22) PCT Filed: Jun. 22, 1999

(86) PCT No.: PCT/EP99/04308

§ 371 (c)(1),
(2), (4) Date: Feb. 28, 2001

(87) PCT Pub. No.: WO99/67486

PCT Pub. Date: Dec. 29, 1999

(30) Foreign Application Priority Data

Jun. 22, 1998 (DE) ........................................ 198 27 722

(51) Int. Cl.[7] .......................... G05B 19/00; G06F 7/00; G08B 29/00; H04B 1/00; H04Q 9/00

(52) U.S. Cl. ................................. 340/5.61; 340/825.69

(58) Field of Search ....................... 340/825.69, 825.72, 340/10.2, 539, 502, 5.61, 5.6; 361/172; 307/10.2, 10.3, 10.5, 10.1; 180/287

(56) References Cited

U.S. PATENT DOCUMENTS 5,055,701 A * 10/1991 Takeuchi ................... 307/10.2
5,131,038 A * 7/1992 Puhl et al. ................. 340/5.61
5,309,144 A * 5/1994 Lacombe et al. ...... 340/539.23
5,552,641 A * 9/1996 Fischer et al. ............. 307/10.5
5,723,911 A * 3/1998 Glehr ........................ 340/10.5
5,828,317 A * 10/1998 Togashi ................. 340/825.69
5,844,517 A * 12/1998 Lambropoulos ............ 341/176

FOREIGN PATENT DOCUMENTS

| | | | |
|---|---|---|---|
| DE | 32 44 566 | A1 | 12/1982 |
| DE | 39 27 024 | A1 | 8/1989 |
| DE | 43 18 596 | A1 | 6/1993 |
| DE | 44 09 167 | C1 | 3/1994 |
| DE | 44 40 855 | A1 | 11/1994 |
| DE | 196 05 836 | C1 | 2/1996 |
| DE | 196 42 017 | C1 | 10/1996 |
| DE | 197 36 302 | A1 | 8/1997 |
| DE | 197 52 861 | A1 | 11/1997 |
| GB | 2 289 358 | A | 11/1995 |
| GB | 2 300 739 | A1 | 11/1996 |
| GB | 2 309 046 | A | 7/1997 |

* cited by examiner

*Primary Examiner*—Brian Zimmerman
*Assistant Examiner*—Nam Nguyen
(74) *Attorney, Agent, or Firm*—Crowell & Moring LLP

(57) ABSTRACT

A vehicle safety device includes a vehicle mounted transceiver for transmitting an inquiry or "challenge" code to an operator-carried transponder which processes the challenge code according to a secret algorithm (which is present also in the vehicle unit), and transmits a response code to the vehicle. The transponder also includes a processor for superimposing on the response code additional information which must be present in order for the vehicle unit to recognize the response as valid. In a preferred embodiment, the bits constituting the response code are transmitted at differing power levels which depend on the data content of the response code.

11 Claims, 2 Drawing Sheets

SAFETY DEVICE

Figure 1:
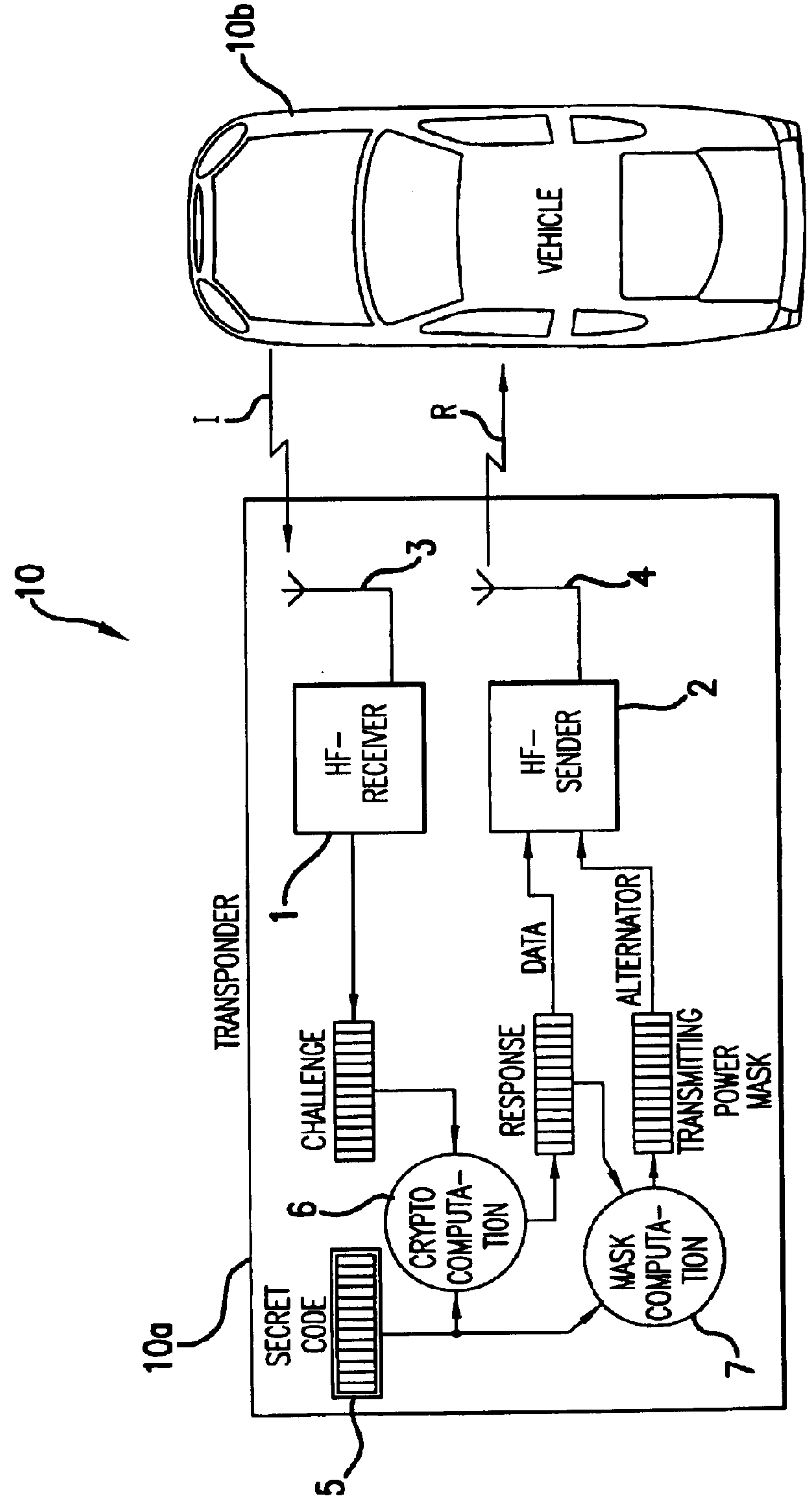

The invention relates to a safety device having the characteristics of the preamble of claim 1.

A safety device of this type is German Patent Document DE 40 03 280 A. In this case, it is prevented that the vehicle be used by an unauthorized person in that either the inquiry code signal or the response code signal has only a short range and therefore becomes operative only when the user is in the direct proximity of the vehicle. In the interim, full-duplex transceivers have become known which permit the "outwitting" of the known safety device. If such a transceiver is situated in the direct proximity of the vehicles and another transceiver is situated in the proximity of the authorized user, an artificial extension of the range is achieved by way of the two transceivers. For the vehicle and for the authorized user, who emit the code signal with a small range, this code signal is received by the nearest transceiver and is transmitted to the other transceiver. As a result, a manipulation can be carried out even if the authorized user is far away from the vehicle. This manipulation is even possible if its distance is larger than the range of the code signal with the large range. The prerequisite is only that the transmission path of the two transceivers is correspondingly large.

It is an object of the invention to provide a safety device of the initially mentioned type by means of which an effective protection of the safety device is achieved against an intentional extension of the range.

The invention achieves this object by means of the characteristics of claim 1.

As a result of the identification of the response code signal, this response code signal receives an additional characteristic. Only if this identification of the response code signal corresponds to the identification expected in the receiver, will the response code signal become effective and lead, if applicable, to the desired function of the vehicle; this is, in the case of an access control, for example, to the opening of the vehicle.

This identification can be designed in different fashions. It will be particularly advantageous if the identification is not defined and predictable but appears accidental toward the outside. If, in particular, the identification is a function of the data content of the response code signal, it is true that the receiver can easily relate the identification to the data content of the response code signal and possibly identify the authorized user.

In contrast, a simple transceiver is not capable of transmitting the identification isochronously (that is, without any loss of time with respect to a code signal provided with such an identification), because it first has to examine the data bits with respect to the identification and must then transmit this identification together with the data bits to the other transceiver. There, it is necessary, in turn to again imprint this identification onto the data bits and to transmit it to the vehicle. It is easily recognizable that the double analysis or conversion of the identification of the individual data bits in the respective transceivers is time-consuming and leads to an increase of the transit time of the received signal.

If, in the receiver, the transit time of the response code signal is now proportioned such that it is identical with the transit time of the inquiry and response code signal in the case of an authorized vehicle user situated in the close range, by a transit limitation for the response code signal, the range manipulation can be recognized and the response code signal cannot not become effective which-occurs, possibly, in the case of such an actual extension of the transit route or as the result of the above-described apparent extension of the transit route, and arrives in a delayed manner.

Further improvements of the invention relate to individual measures for applying the identification and also aim at increasing the transit time of the signal arriving in the vehicle. They are the object of claims 3 to 6 and are explained in greater detail by means of the drawing.

The drawing shows an embodiment of the invention.

Figure 2:
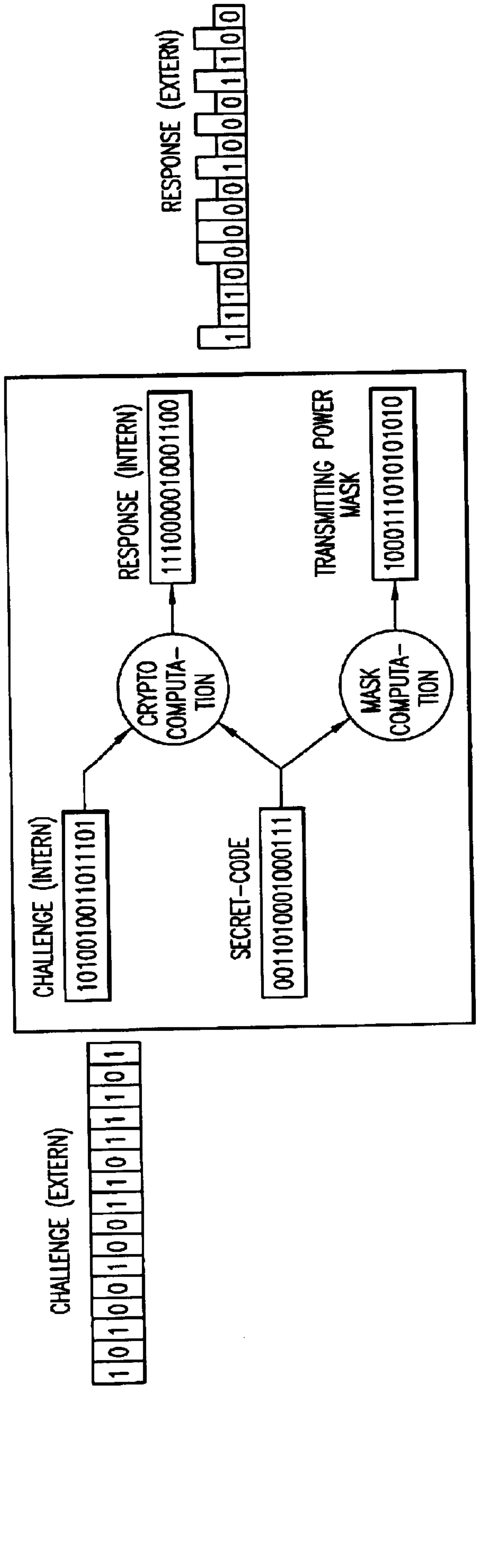

FIG. 1 is a view of the basic construction of a mobile transponder which is used within the scope of the invention; and FIG. 2 is a view of an example of a response code signal which is obtained with the use of the responder.

The safety device 10 illustrated in FIG. 1 includes a transponder 10*a* that contains an HF receiver 1 and an HF transmitter 2 which are linked by radio by way of antennas 3 and 4 with a vehicle (not shown). The receiver 1 receives an inquiry code ("challenge") signal I which is emitted by the vehicle 10*b* and which is illustrated as an example in FIG. 2.

The transponder, which is called an ID generator, supplies a response code signal called "(response(internal)) and illustrated in FIG. 2 again as an example) which is formed, for example, from the challenge code on the basis of a defined algorithm. The algorithm is contained in a memory 5 and is called a "secret code" and illustrated as an example in FIG. 2. The computation of the response code signal takes place in a logic unit 6 which is called a cryptocomputation. The logic unit 6 supplies the response code signal which is present as a bit pattern 0.1 and has, for example, a length of several bytes. This bit pattern represents a data content called data which is transmitted to the transmitter 2.

According to the invention, additionally, an identification is generated which is called a transmitting power mask and which depends, on the one hand, on the algorithm (secret code) decisive for the computing of the response code signal and on the data content of the response code signal itself. This identification is computed in a logic unit 7 ("mask computation") and is transmitted as a transmitting power mask also to the transmitter 2.

The transmitting power mask causes the transmitter 2 to emit the response code signal R in such a manner that certain bits of the response code signal are transmitted by means of a reduced transmitting power of, for example, 50% of the maximum. The response signal (called "response(extern)") is illustrated as an example in FIG. 2.

The receiver receives the response code signal and first analyzes it with respect to its data content. Since the algorithm used as the basis is also known in the receiver, the receiver, analogous to the logic unit 7, can compute the transmitting power mask and superimpose it on the received response code signal. Since, in the case of a correct course, the authorized user is situated in the close range of the vehicle, this additional information supplied by the transmitting power mask can also be analyzed in the receiver of the vehicle and, because the response code signal is present in a time-correct manner, can be identified with respect to the correctness of the imprinted transmitting power mask. In the case of a correct course, the vehicle therefore recognizes the authorized user by means of the coinciding of the data content and of the transmitting power mask of the (external) response code signal.

If, as initially described, two transceivers are used, caused by the necessary recognition of the transmitting powers of each individual bit, a time delay occurs in the transmission of the individual bits of the external response code signal from the first transceiver to the second transceiver and additionally from the second transceiver to the vehicle.

If the point in time at which the response code signal arrives in the vehicle is less than a bit time, the process according to the invention also provides an effective protection against an "intelligent" transceiver, because this transceiver must first read in a bit for determining the transmitting field intensity and must transmit this additional information in a coded manner to the second transceiver. Because of the spacing of the two transceivers with respect to one another, the additional information must be transmitted separately by the first transceiver and must be correspondingly converted at the second transceiver, which is not possible without any loss of time. The response code signal transmitted in this manner arrives clearly belatedly at the vehicle and, because of this time delay, can be recognized as not originating from the authorized user.

As a result, it is also ineffective even if the data content and also the transmitting power mask have the expected characteristics. If it has no identification or not the identification which corresponds to the expected identification, it naturally also remains ineffective. This results in a clear improvement of safety devices and particularly of keyless access systems because these are also protected against a range manipulation. Additional measures, as known from the initially mentioned German Patent Document DE 40 03 280 A and consisting of a different designing of the transmitting power of the two code signals, can then also be eliminated.

What is claimed is:

1. A safety device for a vehicle, in which an inquiry code signal can be emitted by the vehicle and a response code signal can be emitted by a portable transponder and can be processed in the vehicle, wherein:

the response code signal has superimposed thereon an unambiguous additional identification information whose presence is necessary for processing the response code signal; and the additional identification information depends on the data content of the response code signal.

2. The device according to claim 1, wherein the identification information is communicated by a modulation in the transmission of the data bits contained in the response code signal.

3. The device according to claim 2, wherein, within said response code signal, a modulation value for a data bit having a particular information content is variable relative to a modulation value for other data bits having an information content that is the same as the particular information content.

4. The device according to claim 2, wherein the modulation comprises a variation of transmitting power of the respective data bits.

5. The device according to claim 1, wherein bit time is greater than an interval between emission of the inquiry code signal and arrival time of the response code signal.

6. The device according to claim 1, wherein said vehicle recognizes said response code signal as a valid access authorization only if:

said additional information corresponds to additional information calculated at said vehicle; and an actual timing for receipt of said response code signal corresponds to a predetermined expected timing.

7. A method for authentication of a vehicle access unit having a transponder for communicating with a vehicle mounted unit, comprising:

said vehicle mounted unit transmitting a challenge code signal to said transponder;

said transponder processing said challenge signal according to a first secret algorithm for generating a response code signal for transmissions to said vehicle unit;

said transponder superimposing on said response code signal an additional confirmation information, according to a second algorithm, said additional confirmation information being dependent upon a bit content of said response signal;

said transponder transmitting the response code signal with the additional confirmation information superimposed thereon, to said mounted vehicle unit; and said vehicle mounted unit recognizing said response code signal as a valid access authorization only in the presence of said additional confirmation information.

8. A method according to claim 7, wherein said additional confirmation information comprises differing transmission power levels for bits in the response code signal.

9. The method according to claim 7, further comprising:

determining an expected timing for receipt of said response code signal by said vehicle;

wherein said vehicle mounted unit recognizes said response code signal as a valid access authorization only if an actual timing for receipt of said response code signal corresponds to said expected timing.

10. A transponder for receiving a challenge code and sending a coded response thereto, comprising:

a memory having a secret code stored therein;

a receiver for receiving a challenge code;

a crypto data processor which is coupled to receive said challenge code from said receiver, and is programmed to generate an internal response code as a function of the challenge signal and the secret code;

a mask data processor which is coupled to receive said internal response code from said crypto data processor, and is programmed to generate an identification information as a function of said internal response code and said secret code; and a transmitter unit which is coupled to receive said internal response code and said identification information, and which transmits a response code signal that comprises said internal response code, modified by said identification information.

11. The apparatus according to claim 10, wherein:

said identification information comprises a transmission power mask; and power levels of respective bits of said response code signal are modulated according to said transmission power mask.

* * * * *